US008346481B2

(12) United States Patent
Jacobson et al.

(10) Patent No.: US 8,346,481 B2
(45) Date of Patent: Jan. 1, 2013

(54) METHOD AND SYSTEM OF DETERMINING A VALUE INDICATIVE OF GAS SATURATION OF A FORMATION

(75) Inventors: Larry A. Jacobson, Richmond, TX (US); Weijun Guo, Katy, TX (US); Jerome A. Truax, Houston, TX (US); Daniel F. Dorffer, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 286 days.

(21) Appl. No.: 12/812,652

(22) PCT Filed: Dec. 15, 2008

(86) PCT No.: PCT/US2008/086764
§ 371 (c)(1),
(2), (4) Date: Jul. 13, 2010

(87) PCT Pub. No.: WO2010/071626
PCT Pub. Date: Jun. 24, 2010

(65) Prior Publication Data
US 2010/0292927 A1 Nov. 18, 2010

(51) Int. Cl.
*G01V 5/12* (2006.01)
*G06F 19/00* (2011.01)
(52) U.S. Cl. .............. 702/8; 250/269.2; 702/6
(58) Field of Classification Search .......... 702/6, 7, 702/8; 250/256, 264, 266, 269.2, 269.3, 250/269.6, 269.7; 324/303; 376/163, 165
See application file for complete search history.

(56) References Cited

U.S. PATENT DOCUMENTS

| 3,156,822 | A | | 11/1964 | Tittman |
|---|---|---|---|---|
| 3,219,820 | A | | 11/1965 | Hall |
| 3,932,747 | A | | 1/1976 | Sherman |
| 4,078,174 | A | | 3/1978 | Goldman |
| 4,656,354 | A | * | 4/1987 | Randall .................. 250/256 |
| 4,661,701 | A | | 4/1987 | Grau |
| 4,736,204 | A | | 4/1988 | Davison |

(Continued)

FOREIGN PATENT DOCUMENTS

GB  2 427 024 A  12/2008

(Continued)

OTHER PUBLICATIONS

Schwietzer, J.S., Manente, R.A., Hertzog, R.C., "Gamma Ray Spectroscopy Tool; Environmental Effects," Journal of Petroleum Technology (Sep. 1984) 1527-1534.

(Continued)

*Primary Examiner* — John H Le
(74) *Attorney, Agent, or Firm* — Mark E. Scott; Conley Rose, P.C.

(57) ABSTRACT

Determining a value indicative of gas saturation of a formation. At least some of the illustrative embodiments are methods including obtaining an inelastic count rate and a capture count rate of a gamma detector for a particular borehole depth, calculating a ratio of an inelastic count rate to a capture count rate for the particular borehole depth, determining a value indicative of gas saturation based on the ratio of the inelastic count rate to the capture count rate for the particular borehole depth, repeating the obtaining, calculating and determining for a plurality of borehole depths, and producing a plot of the value indicative of gas saturation of the formation as a function of borehole depth.

25 Claims, 4 Drawing Sheets

U.S. PATENT DOCUMENTS

| | | | |
|---|---|---|---|
| 4,928,088 | A | 5/1990 | Jorion |
| 4,992,787 | A | 2/1991 | Helm |
| 5,021,653 | A | 6/1991 | Roscoe |
| 5,528,029 | A | 6/1996 | Chapellat |
| 5,814,988 | A | 9/1998 | Itskovich |
| 5,817,265 | A | 10/1998 | Gendreau |
| 5,817,267 | A | 10/1998 | Covino |
| 5,825,024 | A | 10/1998 | Badruzzaman |
| 5,900,627 | A * | 5/1999 | Odom et al. ............... 250/269.7 |
| 6,005,244 | A | 12/1999 | Vaeth |
| 6,124,590 | A | 9/2000 | Mickael |
| 6,215,304 | B1 | 4/2001 | Slade |
| 6,246,236 | B1 | 6/2001 | Poitzsch |
| 6,831,571 | B2 | 12/2004 | Bartel |
| 6,851,476 | B2 | 2/2005 | Gray |
| 6,967,589 | B1 | 11/2005 | Peters |
| 7,253,402 | B2 | 8/2007 | Gilchrist |
| 7,294,829 | B2 | 11/2007 | Gilchrist |
| 7,361,887 | B2 | 4/2008 | Trcka |
| 7,365,307 | B2 | 4/2008 | Stoller |
| 7,365,308 | B2 | 4/2008 | Trcka |
| 7,372,018 | B2 | 5/2008 | Trcka |
| 2005/0139759 | A1 | 6/2005 | Pitts |
| 2007/0023626 | A1 | 2/2007 | Riley |

FOREIGN PATENT DOCUMENTS

| | | |
|---|---|---|
| WO | 2007015853 A2 | 2/2007 |

OTHER PUBLICATIONS

Hertzog, R., et al.: "Geochemical Logging with Spectrometry Tools," SPE Formation Evaluation (Jun. 1989) 153-162.

Pemper, R., et al.: "A New Pulsed Neutron Sonde for Derivation of Formation Lighology and Mineralogy," paper SPE 102770 presented at the 2006 SPE Annual Technical Conference and exhibition, San Antonio, TX, Sep. 24-27.

Briesmeister, J.F., Editor 2000, "MCNP—A General Monte Carlo N-Particle Transport Code Version 4C," LA-13709-M.

L.A. Jacobson, et al. "Intrinsic Capture Cross-Section and Porosity Transform for the TMD-L Pulsed Nuetron Capture Tool" SPE 30597—Oct. 1995.

A. Badruzzaman, et al. Is Accurate Gas/Steam Determination Behind Pipe Feasible with Pulsed Neutron Measurements?—SPE 110098—Oct.-Nov. 2007.

A. Badruzzaman, et al. Multi-Sensor Through-Casing Density and Saturation Measurement Concepts with a Pulsed Neutron Source: A Modeling Assessment—SPE 89884—Nov. 2004.

A Badruzzaman, et al. Progress and Future of Pulsed Neutron Technology in Oil Field Management—SPE 49228—Sep. 1998.

R. Odom, et al. "Design and Initial Field-Test Results of a New Pulsed-Neutron Logging System for Cased Reservoir Characterization" SPWLA 49th Annual Logging Symposium, May 25-28, 2008.

* cited by examiner

METHOD AND SYSTEM OF DETERMINING A VALUE INDICATIVE OF GAS SATURATION OF A FORMATION

CROSS-REFERENCE TO RELATED APPLICATIONS

This application claims the benefit of Patent Cooperation Treaty Application Ser. No. PCT/US2008/086764, filed Dec. 15, 2008, titled, "Method and system of determining a value indicative of as saturation of a formation", and which application is incorporated by reference herein as if reproduced in full below.

BACKGROUND

Well logging is a technique used to identify characteristics of earth formations surrounding a borehole. The interrogation of a formation surrounding a borehole to identify one or more characteristics may be by sound, electrical current, electromagnetic waves, or high energy nuclear particles (e.g., gamma particles and neutrons). Receiving the interrogating particle or signal, and determining a formation property from such particle or signal, is in many cases a complicated endeavor sometimes involving detecting the interrogating particles or signals at multiple detectors on a logging tool. Any system or method that simplifies the detection of interrogating particle or signals, and thus simplifies determination of formation property, provides a competitive advantage in the marketplace.

BRIEF DESCRIPTION OF THE DRAWINGS

For a detailed description of exemplary embodiments, reference will now be made to the accompanying drawings in which:

FIG. 6 shows a computer system in accordance with at least some embodiments.

NOTATION AND NOMENCLATURE

Figure 1:
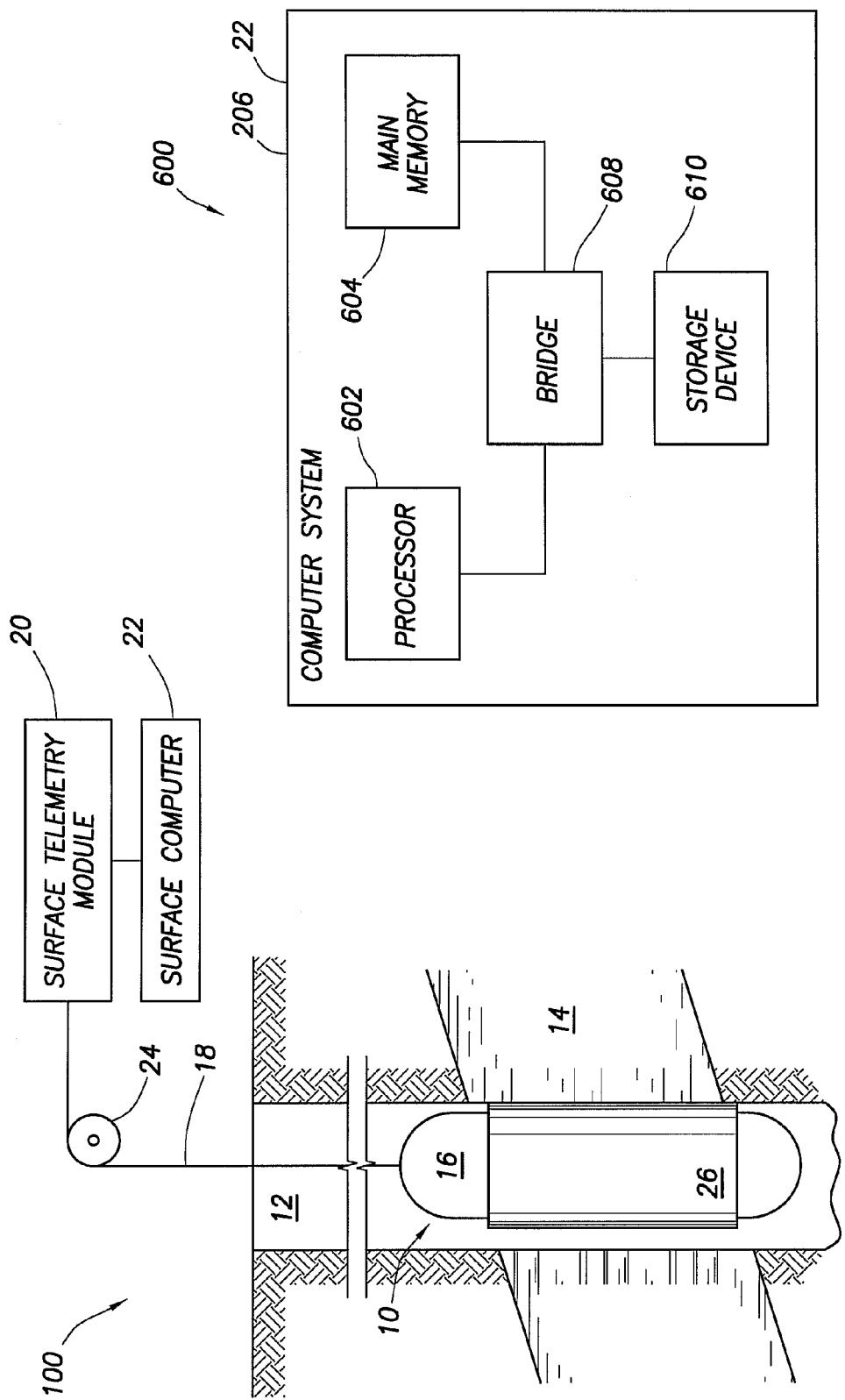
FIG. 1 shows a system in accordance with at least some embodiments.

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Gamma count rate decay curve" shall mean, for a particular gamma detector, a plurality of count values, each count value based on gammas counted during a particular time bin. The count values may be adjusted up or down to account for differences in the number of neutrons giving rise to the gammas or different tools, and such adjustment shall not negate the status as a "gamma count rate decay curve."

"Inelastic count rate" shall mean a gamma count rate during periods of time when gammas created by inelastic collisions are the predominant gammas created and/or counted (e.g., during the neutron burst period). The minority presence of counted capture gammas shall not obviate a count rate's status as an inelastic count rate.

"Capture count rate" shall mean a gamma count rate during periods of time when gammas created by thermal neutron capture are the predominant gammas created and/or counted (e.g., periods of time after the neutron burst period). The minority presence of counted inelastic gammas shall not obviate a count rate's status as capture count rate.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments were developed in the context of wireline logging tools, and thus the description that follows is based on the developmental context; however, the various systems and methods find application not only in wireline logging tools, but also measuring-while-drilling (MWD) and logging-while-drilling tools (LWD). Further still, the various embodiments also find application in "slickline" tools, in which the logging tool is placed downhole (e.g., as part of a drill string, or as a standalone device) and the logging tool gathers data that is stored in a memory within the device (i.e., not telemetered to the surface). Once the tool is brought back to the surface, the data is downloaded, some or all the processing takes place, and the logging data is printed or otherwise displayed. Thus, the developmental context shall not be construed as a limitation as to the applicability of the various embodiments.

FIG. 1 illustrates a nuclear logging system 100 constructed in accordance with a least some embodiments. In particular, system 100 comprises a logging tool 10 placed within a borehole 12 proximate to a formation 14 of interest. The tool 10 comprises a pressure vessel 16 within which various subsystems of the tool 10 reside, and in the illustrative case of FIG. 1 the pressure vessel 16 is suspended within the borehole 12 by a cable 18. Cable 18, in some embodiments a multi-conductor armored cable, not only provides support for the pressure vessel 16, but also in these embodiments communicatively couples the tool 10 to a surface telemetry module 20 and a surface computer 22. The tool 10 may be raised and lowered within the borehole 12 by way of the cable 18, and the depth of the tool 10 within the borehole 12 may be determined by depth measurement system 24 (illustrated as a depth wheel). In some embodiments, the pressure vessel 16 may be covered with a thermal neutron absorptive material 26 (the thickness of which is exaggerated for clarity of the figure); however, in other embodiments the material 26 may be only partially present or omitted altogether.

Figure 2:
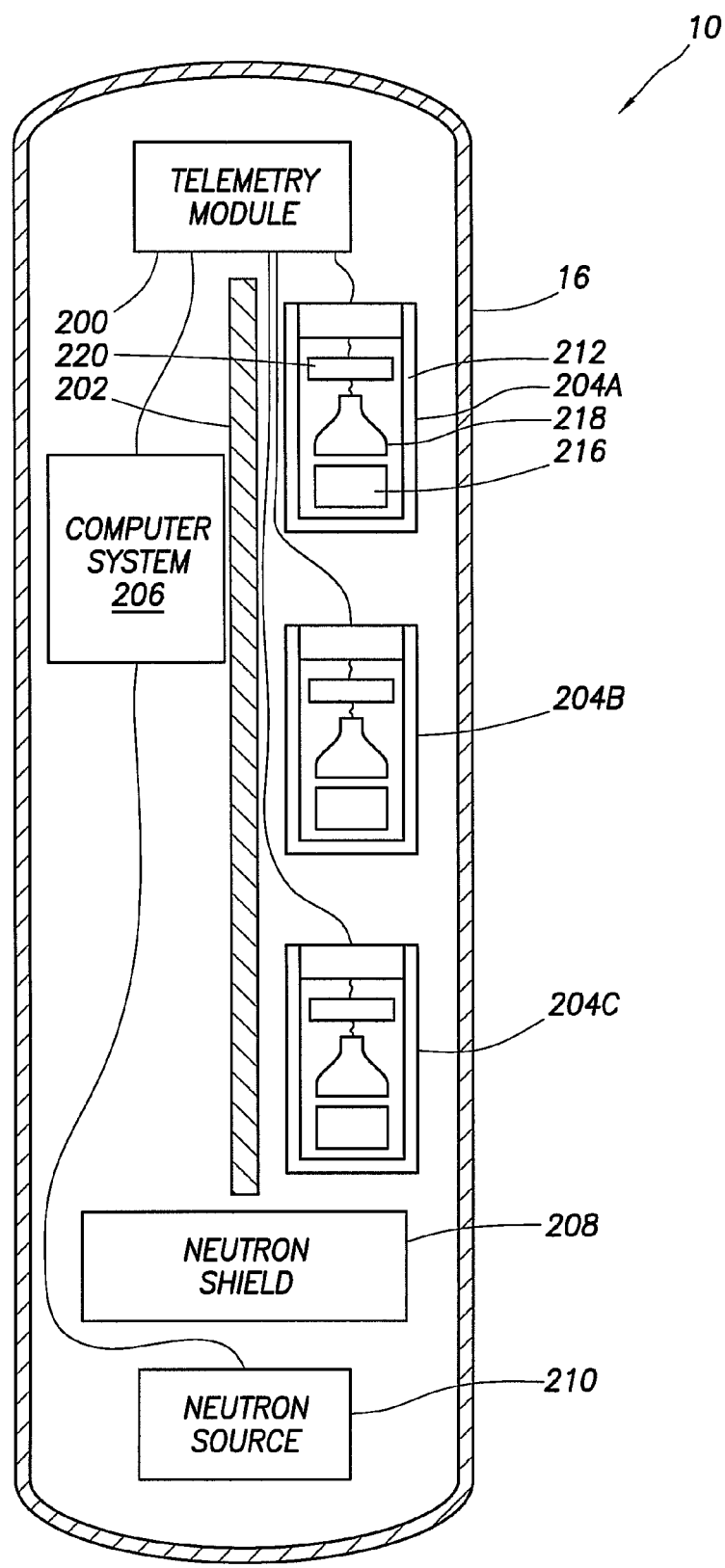
FIG. 2 shows a simplified cross-sectional view of a logging tool in accordance with at least some embodiments.

FIG. 2 shows a simplified cross-sectional view of the logging tool 10 to illustrate the internal components in accordance with at least some embodiments. In particular, FIG. 2 illustrates that the pressure vessel 16 houses various components, such as a telemetry module 200, borehole shield 202, a plurality of gamma detectors 204 (in this illustrative case three gamma detectors labeled 204A, 204B and 204C), computer system 206, a neutron shield 208 and a neutron source 210. While the gamma detectors 204 are shown above the neutron source 210, in other embodiments the gamma detectors may be below the neutron source. Gamma detector 204C may be on the order of 12 inches from the neutron source. The gamma detector 204B may be on the order of 24 inches from the neutron source 210. The gamma detector 204A may be on the order of 32.5 to 36 inches from the neutron source 210. Other spacing may be equivalently used. Neutron shield 202 may make the gamma detectors 204 receive more favorably formation-sourced gammas (as opposed to borehole-sourced gammas), and the shield may be a high density material (e.g., HEVIMET® available from General Electric Company of Fairfield, Conn.).

In some embodiments the neutron source 210 is a Deuterium/Tritium neutron generator. However, any neutron source capable of producing and/or releasing neutrons with sufficient energy (e.g., greater than 8 Mega-Electron Volt (MeV)) may equivalently used. The neutron source 210, under command from surface computer 22 in the case of wireline tools, or computer system 206 within the tool in the case of MWD, LWD or slickline tools, generates and/or releases energetic neutrons. In order to reduce the eradiation of the gamma detectors 204 and other devices by energetic neutrons from the neutron source 210, neutron shield 208 (e.g., HEVIMET®) separates the neutron source 210 from the gamma detectors 204. Because of the speed of the energetic neutrons (e.g., 30,000 kilometers/second or more), and because of collisions of the neutrons with atomic nuclei that change the direction of movement of the neutrons, a neutron flux is created around the logging tool 10 that extends into the formation 14.

Neutrons generated and/or released by the source 210 interact with atoms by way of inelastic collisions and/or thermal capture. In the case of inelastic collisions, a neutron inelastically collides with atomic nuclei, a gamma is created (an inelastic gamma), and the energy of the neutron is reduced. The neutron may have many inelastic collisions with the atomic nuclei, each time creating an inelastic gamma and losing energy. At least some of the gammas created by the inelastic collisions are incident upon the gamma detectors 204. One or both of the arrival time of a particular gamma and its energy may be used to determine status as an inelastic gamma.

After one or more inelastic collisions (and corresponding loss of energy) a neutron reaches an energy known as thermal energy (i.e., a thermal neutron). At thermal energy a neutron can be captured by atomic nuclei. In a capture event the capturing atomic nucleus enters an excited state and the nucleus later transitions to a lower energy state by release of energy in the form of a gamma (known as a thermal gamma). At least some of the thermal gammas created by thermal capture are also incident upon the gamma detectors 204. One or both of the arrival time of a particular gamma and its energy may be used to determine its status as a capture gamma. Only inelastic and thermal capture interactions produce gammas, however.

Still referring to FIG. 2, when operational the gamma detectors 204 detect arrival and energy of gammas. Referring to gamma detector 204A as indicative of all the gamma detectors 204, a gamma detector comprises an enclosure 212, and within the enclosure 212 resides; a crystal 216 (e.g., a three inch by four inch yttrium/gadolinium silicate scintillation crystal); a photo multiplier tube 218 in operational relationship to the crystal 216; and a processor 220 coupled to the photomultiplier tube 218. As gammas are incident upon/within the crystal 216, the gammas interact with the crystal 216 and flashes of light are emitted. Each flash of light itself is indicative of an arrival of a gamma, and the intensity of light is indicative of the energy of the gamma. The output of the photomultiplier tube 218 is proportional to the intensity of the light associated with each gamma arrival, and the processor 220 quantifies the output as gamma energy and relays the information to the surface computer 22 (FIG. 1) by way of the telemetry module 200 in the case of a wireline tool, or to the computer system 206 within the tool in the case of a MWD, LWD or slickline tools.

Figure 3:
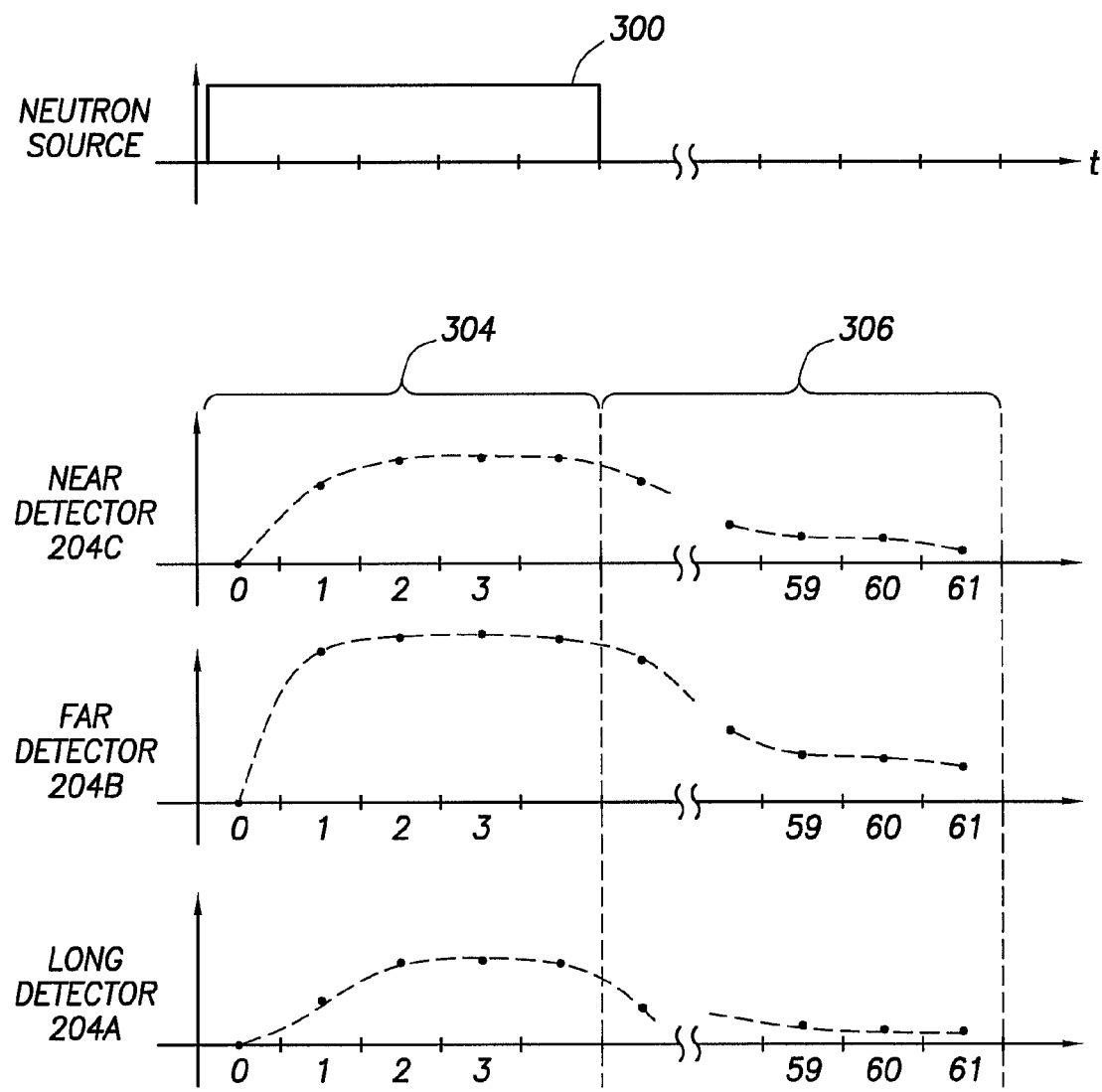
FIG. 3 shows a plurality of graphs of count rate as a function of time in accordance with at least some embodiments.

FIG. 3 shows a plurality of graphs as a function of corresponding time in order to describe how the gamma arrivals are recorded and characterized in accordance with at least some embodiments. In particular, FIG. 3 shows a graph relating to activation of the neutron source 210, as well as gamma count rates for the near detector 204C, the far detector 204B, and the long detector 204A. The graph with respect to the neutron source 210 is Boolean in the sense that it shows when the neutron source is generating and/or releasing neutrons (i.e., the burst period), and when the neutron source is not. In particular, with respect to the neutron source graph, the neutron source is generating and/or releasing neutrons during the asserted state 300, and the neutron source is off during the remaining time. In accordance with the various embodiments, a single interrogation (at a particular borehole depth) comprises activating the neutron source for a predetermined amount of time (e.g., 80 microseconds) and counting the number of gamma arrivals by at least one of the detectors during the activation time of the neutron source and for a predetermined amount of time after the source is turned off. In at least some embodiments, the total amount of time for a single interrogation (i.e., a single firing of the neutron source and the predetermined amount of time after the neutron source is turned off) may span approximately 1250 microseconds (µs), but other times may be equivalently used.

Still referring to FIG. 3, with respect to counting gamma arrivals by the gamma detectors 204, the interrogation time is divided into a plurality of time slots or time bins. With reference to the graph for the long detector 204A as illustrative of all the gamma detectors, in some embodiments the interrogation time is divided into 61 total time bins. In accordance with at least some embodiments, the first 32 time bins each span 10 µs, the next 16 time bins each span 20 µs, and the remaining time bins each span 50 µs. Other numbers of time bins, and different time bin lengths, may be equivalently used. Each gamma that arrives within a particular time bin increases the count value of gammas within that time bin. While in some embodiments the actual arrival time of the gammas within the time bin may be discarded, in other embodiments the actual arrival may be retained and used for other purposes. Starting with time bin 0, the gamma detector counts the gamma arrivals and increases the count value for the particular time bin for each gamma arrival. Once the time period for the time bin expires, the system starts counting anew the arrivals of gammas within the next time bin until count values for all illustrative 61 time bins have been obtained. In some cases, the system starts immediately again by activating the neutron source and counting further time bins; however, the count values within each time bin (for a particular borehole depth) are recorded either by way of the surface computer 22 in the case of wireline tools, or by the computer system 206 within the tool in the case of a MWD, LWD or slickline tools.

Illustrative count values for each time bin are shown in FIG. 3 as dots in the center of each time bin. The count value for each time bin is represented by the height of the dot above the x-axis (i.e., the y-axis value). Taking all the count values for a particular detector together, the dots may be connected by an imaginary line (shown in dashed form in FIG. 3) to form a mathematical curve illustrative of the number of gamma arrivals as a function of time detected by the particular gamma detector. In accordance with the various embodiments, the plurality of count values is referred to as a gamma count rate decay curve. All the curves taken together (the curve for each gamma detector) may be referred to as full-set decay curves.

Because of the physics of the combined logging tool and surrounding formation, within certain time periods certain types of gammas are more likely to be created, and thus more likely to be counted by the one or more active gamma detectors 204. For example, during the period of time within which the neutron source 210 is activated (as indicated by line 300), the energy of neutrons created and/or released leads predominantly to creation of inelastic gammas. The period of time in the gamma count rate decay curves where the gammas are predominantly inelastic gammas is illustrated by time period 304. Thus, gammas counted during some or all of the time period 304 may be considered inelastic gammas. Some capture gammas may be detected during the time period 304, and in some embodiments the minority presence of capture gammas may be ignored. In yet still other embodiments, because capture gammas are distinguishable from inelastic gammas based on energy, the portion of the count rate during time period 304 attributable to capture gammas may be removed algorithmically.

Similarly, after the neutron source 210 is no longer activated, the average energy of the neutrons that make up the neutron flux around the tool 10 decreases, and the lower energy of the neutrons leads predominantly to creation of capture gammas. The period of time in the gamma count rate decay curves where the gammas are predominantly capture gammas is illustrated by time period 306. Thus, gammas counted during some or all of the time period 306 may be considered capture gammas. Some inelastic gammas may be detected during the time period 306, and in some embodiments the minority presence of inelastic gammas may be ignored. In yet still other embodiments, because inelastic gammas are distinguishable from capture gammas based on energy, the portion of the count rate during time period 306 attributable to inelastic gammas may be removed algorithmically.

The inventors of the present specification have found that a gamma count rate decay curve from a single gamma detector may be used to determine a value indicative of gas saturation of the formation 14 at the particular borehole depth for which the gamma count rate decay curve is determined. More particularly still, the inventors of the present specification have found that a relationship between the inelastic count rate and the capture count rate of a gamma count rate decay curve is indicative of gas saturation. Consider, as an example, a single gamma count rate decay curve, such as the long detector 204A gamma count rate decay curve of FIG. 3. In accordance with the various embodiments, a ratio is taken of the inelastic count rate to the capture count rate of the gamma count rate decay curve. The inelastic count rate may be the summed count rate from one or more of the time bins within time period 304. In accordance with some embodiments, the count rates from all the time bins within time period 304 are summed and used as the inelastic count rate. The capture count rate may be the summed count rate from one or more of the time bins within time period 306. In accordance with some embodiments, the count rates from time bins within time period 306 that span 100 µs to 1000 µs after the deactivation of the neutron source 210. In some embodiments, the ratio is the inelastic count rate divided by the capture count rate, and in other embodiments the ratio is the capture count rate divided by the inelastic count rate.

Figure 4:
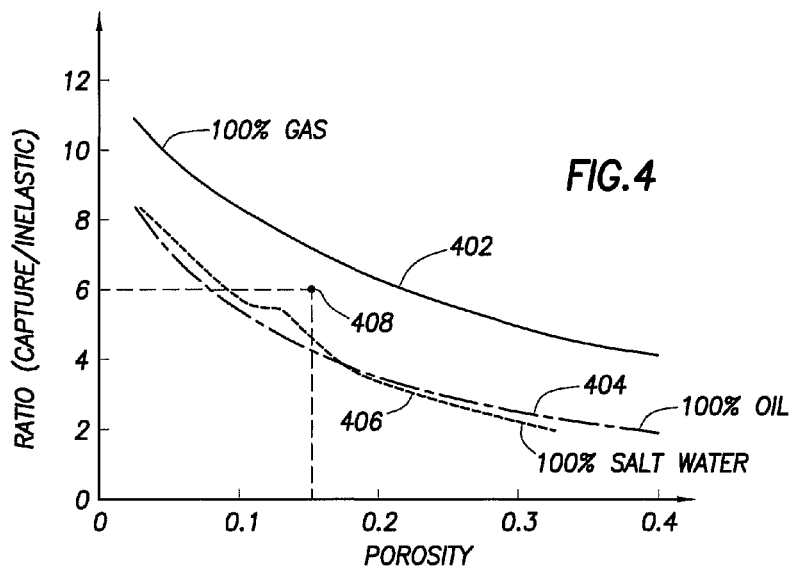
FIG. 4 shows an illustrative relationship between ratio of inelastic count rate to capture count rate, porosity and gas saturation of a formation in accordance with at least some embodiments.

Using the ratio, a value of the gas saturation of the surrounding formation may be determined based on borehole size, drilling fluid type, casing size (if present) and porosity of the surrounding formation. FIG. 4 shows an illustrative relationship between a range of possible ratios (in the illustrative form of capture count rate divided by inelastic count rate), a range of possible porosities of the formation, and the gas saturation. The solid line 402 is representative of 100% gas saturation. The dash-dot-dash line 404 is representative of 100% oil saturation (0% gas). Likewise, the dashed line 406 is representative of 100% salt water saturation (again 0% gas). To a great extent, the lines 404 and 406 overlap in practice, but are separated slightly in the figure so as to be distinguishable. The relationship of FIG. 4 changes with changing borehole size, casing size and borehole fluid type; however, such parameters will be known for each situation in which the logging tool is operated. The illustrative FIG. 4 is based on a 6 inch borehole, a 4.5 inch casing, and a hydrocarbon filled borehole.

A relationship such as that illustrated by FIG. 4 is used to determine a value indicative of gas saturation using the ratio of inelastic count rate to capture count rate and the porosity. If a plotted point (plotted based on a particular ratio at a particular porosity) falls on the 100% gas or 0% gas lines, then the value indicative of gas saturation is 100% or 0%, respectively for the particular ratio. If a plotted point falls between the 100% gas and 0% gas lines, the value indicative of gas saturation may be interpolated. In some cases, a straight line relationship may exist, such that a distance between the 100% gas and 0% gas lines directly indicates the value indicative of gas saturation. In other cases, the relationship may be other than a straight line relationship, in which case the value indicative of gas saturation may be determined based on the particular relationship. For the non-straight line case, the relationship may be determined (in some embodiments in advance) by any suitable method, such as modeling. In further embodiments, the gas saturation determined may be considered with a gas saturation value from a previous measurement of gas saturation at the particular borehole depth (e.g., after depletion caused by extraction and/or after a carbon dioxide injection procedure), and thus the value indicative of gas saturation may be a value of a change in gas saturation, such as gas depletion.

Consider, for purposes of explanation, that for a particular borehole depth a ratio value of approximately 6.0 is calculated, and that the porosity of the formation at the particular borehole depth is 0.15. Point 408 is representative of a ratio of 6.0 and porosity of 0.15. Plotted point 408 falls between 100% gas and 0% gas lines. Based on the relationship of the actual gas saturation when the ratio falls between the extremes, the value of indicative of gas saturation may be determined for the particular borehole depth based on the plotted point 408. The process of obtaining the gamma count rate decay curve, calculating the ratio, and determining the value indicative of gas saturation may be repeated for a plurality of borehole depths, and the values plotted. Plotting may be on chart paper with other formation parameters of interest, or the plotting may be by way of a computer monitor.

The various embodiments discussed to this point have implicitly assumed that the gamma count rate decay curves are obtained by a logging tool contemporaneously with calculating the ratio and determining the value indicative of gas saturation. However, in other embodiments calculating the ratio and determining the value indicative of gas saturation may take place non-contemporaneously with a logging tool obtaining the gamma count rate decay curves. Stated otherwise, the embodiments of determining a value indicative of the gas saturation may take place with respect to historical logging data gathered hours, days, weeks or months in advance of the calculating the ratio and determining the value indicative of gas saturation, so long as porosity values are also present, or can be calculated.

The logging tool 10 of FIG. 2 illustrates three gamma detectors 204. However, the various embodiments of calculating the ratio and determining the value indicative of gas saturation utilize the gamma count rate decay curves from a single gamma detector. In some cases, the long detector 204A provides better gamma count rate decay curves for determining the value indicative of gas saturation. However, as the porosity of the formation surrounding the borehole increases, better gamma count rate decay curves for determining the value indicative of gas saturation may be obtained from the closer spaced gamma detectors 204. Thus, in some embodiments, the gamma detector 204 used to read the gamma count rate decay curve for determination of the value indicative of gas saturation is selected based on a value indicative of porosity. For example, if the porosity of the formation is known prior to the running the tool 10 within the borehole (i.e., the porosity is determined non-contemporaneously with obtaining the gamma count rate decay curves and held in a database), then a gamma detector 204 may be selected based on the previously determined porosity. In yet still other embodiments, though only one gamma detected 204 is needed for purposes of determining values indicative gas saturation, two or more of the gamma detectors 204 may nevertheless be operational for measuring other formation parameters of interest, such as a value indicative of porosity. In embodiments where the value indicative of porosity (e.g., ratio of the capture count rate for two detectors) is measured contemporaneously with obtaining the gamma count rate decay curves, the gamma detector 204 used for determining the value indicative of gas saturation may be selected based on the contemporaneously determined value indicative of porosity. Further still, over the course of single logging run, multiple gamma detectors 204 may be used, one at a time, for determining the value indicative of gas saturation based on the values indicative of porosity of the formation at different borehole depths.

Figure 5:
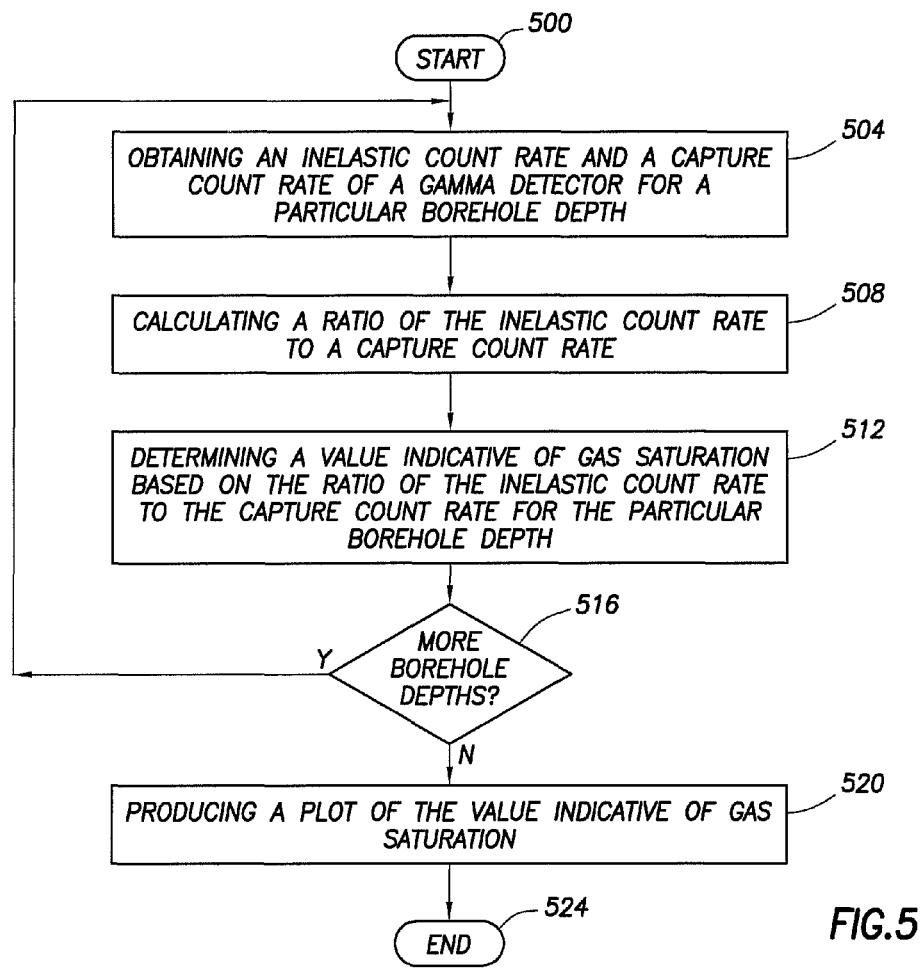
FIG. 5 shows a method in accordance with at least some embodiments.

FIG. 5 illustrates a method in accordance with at least some embodiments, where the method may be implemented, at least in part, by the surface computer system 22, the computer system 206 within the logging tool, or any other general purpose or special purpose computer system. In particular, the method starts (block 500) and proceeds to obtaining an inelastic count rate and a capture count rate of a gamma detector for a particular borehole depth (block 504). In some embodiments, the obtaining is by operation of the nuclear logging tool contemporaneously with the further steps of the illustrative method, while in other embodiments the obtaining is from a database of gamma count rates generated based on operation of the nuclear logging tool non-contemporaneously with the further steps of the illustrative method. Regardless of the precise mechanism of obtaining the gamma count rates, the illustrative method then moves to calculating a ratio of the inelastic count rate to a capture count rate (block 508). In some embodiments the ratio is the inelastic count rate divided by the capture count rate, but in other embodiments the ratio is the capture count rate divided by the inelastic count. Next, the method moves to a determination of a value indicative of gas saturation based on the ratio of the inelastic count rate to the capture count rate for the particular borehole depth (block 512). In some cases the determination of the value may be based on porosity of the formation surrounding the borehole at the particular borehole depth, such as by a relationship similar to that shown in illustrative FIG. 4. While one value indicative of gas saturation at a particular borehole depth may be useful in some circumstances, in some cases the obtaining (block 504), calculating the ratio (block 508) and determining the value of gas saturation (block 512) may be repeated for a plurality of borehole depths (block 516). Thereafter, a plot of the value indicative of gas saturation is produced (block 520), and the illustrative method ends (block 524). The plotting may take many forms. In some cases, a paper plot with the value indicative of borehole depth may be created, and in yet other cases the plot may be by way of a display device coupled to a computer system.

FIG. 6 illustrates in greater detail a computer system 600, which is illustrative of both the surface computer system 22 and the computer system 206 within the logging tool 10. Thus, the computer system 600 described with respect to FIG. 6 could be proximate to the borehole during the time period within the tool 10 is within the borehole, the computer system 600 could be located at the central office of the oilfield services company, or the computer system 600 could be within the logging tool 10 (such as for LWD or MWD tools). The computer system 600 comprises a processor 602, and the processor couples to a main memory 604 by way of a bridge device 608. Moreover, the processor 602 may couple to a long term storage device 610 (e.g., a hard drive) by way of the bridge device 608. Programs executable by the processor 602 may be stored on the storage device 610, and accessed when needed by the processor 602. The program stored on the storage device 610 may comprise programs to implement the various embodiments of the present specification, including programs to implement selecting a gamma detector to use in the gas saturation determination, calculating the ratio of the inelastic gamma count rate to capture gamma count rate, calculating the value of indicative of gas saturation, and producing a plot of the value indicative of gas saturation. In some cases, the programs are copied from the storage device 610 to the main memory 604, and the programs are executed from the main memory 604. Thus, both the main memory 604 and storage device 610 are considered computer-readable storage mediums. The ratios and values indicative of gas saturation predicted by the computer system 610 may be sent to a plotter that creates a paper-log, or the values may be sent to a display device which may make a representation of the log for viewing by a geologist or other person skilled in the art of interpreting such logs.

From the description provided herein, those skilled in the art are readily able to combine software created as described with appropriate general-purpose or special-purpose computer hardware to create a computer system and/or computer sub-components in accordance with the various embodiments, to create a computer system and/or computer sub-components for carrying out the methods of the various embodiments and/or to create a computer-readable media that stores a software program to implement the method aspects of the various embodiments.

The above discussion is meant to be illustrative of the principles and various embodiments of the present invention. Numerous variations and modifications will become apparent to those skilled in the art once the above disclosure is fully appreciated. For example, in some embodiments, the counts associated with capture gammas are removed from the inelastic count rate, and counts associated with inelastic gammas are removed from the capture count rate, prior to calculating the ratio. In other cases, however, the presence of counts of capture gammas in the inelastic count rate, and likewise the presence of inelastic gammas in the capture count, is ignored for purposes of calculating the ratio. Finally, preprocessing of the data may take place, such as dead-time correction and environmental correction, without affecting scope of this specification. It is intended that the following claims be interpreted to embrace all such variations and modifications.

We claim:

1. A method comprising:
    obtaining an inelastic count rate and a capture count rate of a gamma detector for a particular borehole depth associated with a formation;
    calculating a ratio of the inelastic count rate to the capture count rate of the gamma detector for the particular borehole depth;
    determining a value indicative of gas saturation based on the ratio of the inelastic count rate to the capture count rate of the gamma detector for the particular borehole depth; and
    producing a plot of the value indicative of gas saturation of the formation as a function of borehole depth.

2. The method of claim 1 wherein obtaining further comprises obtaining a gamma count rate decay curve of the gamma detector of a nuclear logging tool, the gamma count rate decay curve for the particular borehole depth.

3. The method of claim 1 wherein obtaining further comprises obtaining from a database of count rates based on operation of a nuclear logging tool non-contemporaneously with the calculating.

4. The method of claim 1 wherein determining the value indicative of gas saturation further comprises determining based on porosity of the formation at the particular borehole depth.

5. The method of claim 4 wherein the method further comprises one or more selected from the group consisting of: measuring porosity contemporaneously with operating a nuclear tool obtaining the gamma count rates; and determining porosity from a database of porosity values based on operation of a logging tool non-contemporaneously with the obtaining.

6. The method of claim 1 further comprising, prior to obtaining, selecting the gamma detector from a plurality of possible gamma detectors, the selecting based on a value indicative of porosity of the formation at the particular borehole depth.

7. The method of claim 6 wherein the method further comprises one or more selected from the group consisting of: measuring porosity contemporaneously with operating a nuclear tool obtaining the gamma count rates; and determining porosity from a database of porosity values based on operation of a logging tool non-contemporaneously with the obtaining.

8. The method of claim 1 wherein calculating further comprises calculating the ratio based on the capture count rate at least partially between 100 microseconds and 1000 microseconds after a neutron burst period.

9. The method of claim 1 further comprising correcting the inelastic count rate for capture gammas counted among the inelastic count rate.

10. The method of claim 1 wherein obtaining further comprises operating the nuclear logging tool in the borehole contemporaneously with the calculating.

11. A system comprising:
    a downhole tool comprising a source of neutrons and a gamma detector, the gamma detector counts gamma arrivals;
    a processor coupled to a memory, and the processor coupled to the gamma detector;
    wherein the memory stores a program that, when executed by the processor, causes the processor to:
        calculate a ratio of inelastic count rate to a capture count rate of the gamma detector for a particular depth within a borehole; and
        determine a value indicative of gas saturation for the particular depth based on the ratio.

12. The system of claim 11 wherein when the processor determines the value, the program further causes the processor to determine based on porosity of a formation at the particular borehole depth.

13. The system of claim 12 wherein when the processor determines, the program causes the processor to at least one selected from the group consisting of: use a porosity value determined using a different downhole tool; and use a porosity value determined using the downhole tool.

14. The system of claim 11 further comprising:
    a plurality of gamma detectors, each gamma detector at a different distance from the source of neutrons, and each gamma detector counts gamma arrivals;
    wherein the program on the memory, when executed by the processor, further causes the processor to select the gamma detector from the plurality of gamma detectors whose gamma count rates are used to calculate the ratio and determine the value.

15. The system of claim 14 wherein when the processor selects, the program further causes the processor to select at least two different gamma detectors during the course of a logging run.

16. The system of claim 11 wherein the processor is at least one selected from the group consisting of: communicatively coupled to the downhole tool by way of a wireline; resides within the downhole tool.

17. A computer-readable storage media storing a program that, when executed by a processor, causes the processor to:
    obtain an inelastic count rate and capture count rate with respect to a first gamma detector and for a particular borehole depth;
    calculate a ratio of the inelastic count rate to the capture count rate of the first gamma detector the particular borehole depth within a borehole; and
    determine a value indicative of gas saturation for the particular borehole depth based on the ratio.

18. The computer-readable storage medium of claim 17 wherein when the processor obtains, the program causes the processor to obtain a plurality of gamma count rate decay curves with respect to the first gamma detector, each gamma count rate decay curve comprising a plurality of count values for a respective plurality of time bins.

19. The computer-readable storage media of claim 17 wherein when the processor obtains, the program causes the processor to obtain the count rates from a repository of count rates based on operation of a nuclear logging tool non-contemporaneously with the calculating.

20. The computer-readable storage media of claim 17 wherein when the processor determines, the program causes the processor to determine the value indicative of gas saturation based on porosity of a formation at the particular borehole depth.

21. The computer-readable storage media of claim 20 wherein program further causes the processor to at least one selected from the group consisting of: use the porosity determined contemporaneously with operating a nuclear tool obtaining the gamma count rates; and use the porosity from a database of porosity values based on operation of a logging tool non-contemporaneously with obtain the gamma count rates.

22. The computer-readable storage media of claim 17 wherein the program further causes the processor to, prior to obtaining the count rates, select the gamma detector from a plurality of possible gamma detectors, the selection based on a value indicative of porosity of a formation at the particular borehole depth.

23. The computer-readable storage media of claim 22 wherein program further causes the processor to at least one selected from the group consisting of: use the porosity determined contemporaneously with operating a nuclear tool obtaining the gamma count rates; and use the porosity from a database of porosity values based on operation of a logging tool non-contemporaneously with obtain the gamma count rates.

24. The computer-readable storage media of claim 17 wherein when the processor calculates, the program causes the processor to calculate the ratio based on the capture count rate at least partially between 100 microseconds and 1000 microseconds after a neutron burst period.

25. The computer-readable storage media of claim 17 wherein when the processor obtains, the program further causes the processor to operate a nuclear logging tool in the borehole contemporaneously with the calculation of the ratio.

* * * * *

UNITED STATES PATENT AND TRADEMARK OFFICE
CERTIFICATE OF CORRECTION

PATENT NO. : 8,346,481 B2
APPLICATION NO. : 12/812652
DATED : January 1, 2013
INVENTOR(S) : Larry A. Jacobson et al.

It is certified that error appears in the above-identified patent and that said Letters Patent is hereby corrected as shown below:

In the Claims:

Column 11, lines 10-13 should read "obtaining the gamma count rates; and use the porosity from a database of porosity values based on operation of a logging tool determined non-contemporaneously with obtaining the gamma count rates."

Signed and Sealed this
Twenty-third Day of April, 2013

Teresa Stanek Rea
*Acting Director of the United States Patent and Trademark Office*